July 15, 1969 — M. C. ZELLER — 3,455,272

POSITION REFERENCE APPARATUS

Filed Dec. 30, 1966 — 2 Sheets-Sheet 1

INVENTOR:
MARTIN C. ZELLER,
BY Matthew P. Lynch
ATTORNEY

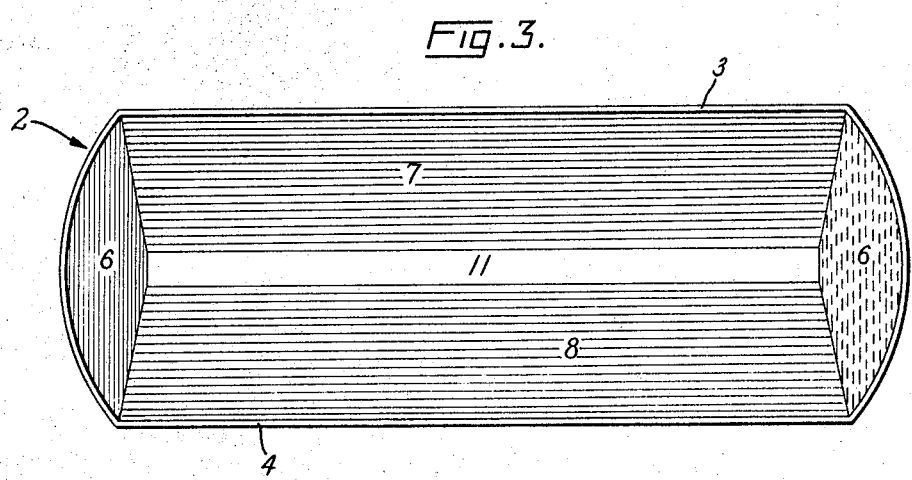
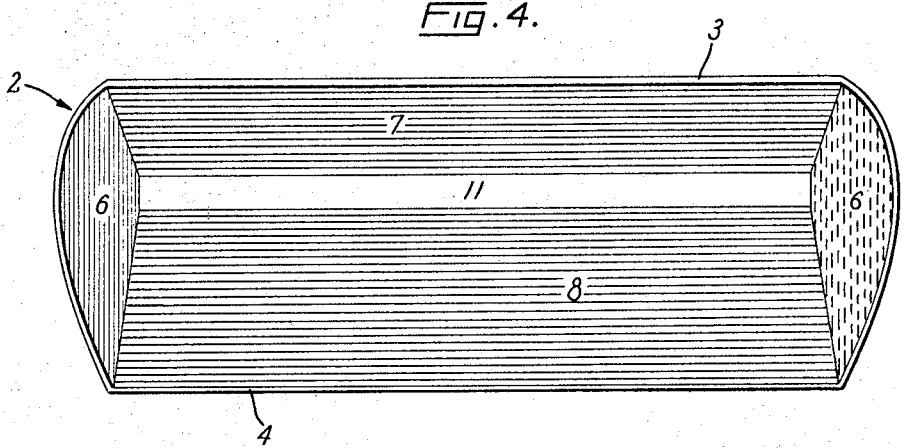
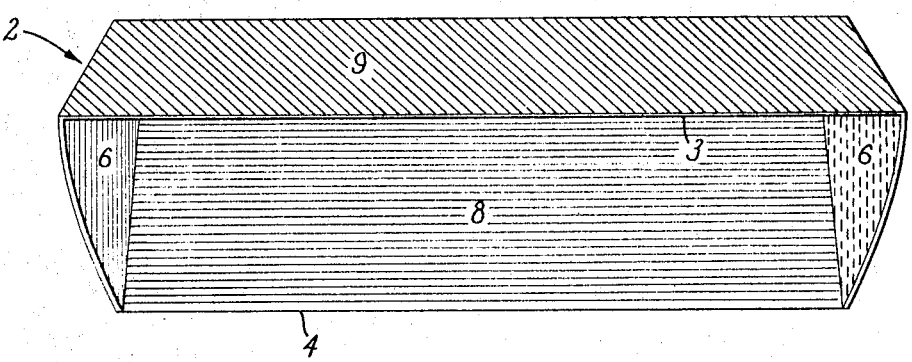

United States Patent Office 3,455,272
Patented July 15, 1969

3,455,272
POSITION REFERENCE APPARATUS
Martin C. Zeller, Chester, Pa., assignor to The Boeing Company, Seattle, Wash., a corporation of Delaware
Filed Dec. 30, 1966, Ser. No. 606,309
Int. Cl. G09f 9/00
U.S. Cl. 116—124        9 Claims

ABSTRACT OF THE DISCLOSURE

Apparatus providing a position reference for aircraft when flying in formation at night. A pair of angularly disposed legs have illuminated external and internal wall surfaces and an opaque bar is placed co-extensively with a line of intersection of the legs. The external wall surfaces are illuminated in colors contrasting to those of the internal wall surfaces such that a pilot of one aircraft viewing the apparatus on an accompanying aircraft in formation can determine his vertical position relative to the accompanying aircraft. End plates adapted to be illuminated in colors contrasting to the colors of the external and internal wall surfaces can also be provided to enable the pilot to determine his relative position in azimuth.

---

This invention relates to a position reference system, and, more particularly, to a color coded position reference system for night formation flying.

In view of the cost of present day aircraft, it is highly desirable to obtain maximum utilization of the aircraft. In order to obtain maximum utilization, the aircraft must be capable of operating not only in daylight, but also in the evenings. However, flying in formation after nightfall is extremely difficult and dangerous due to the lack of relative position and attitude information between the various aircraft. In order to permit night-time formation flying and eliminate some of the dangers existent therein, various types of position reference apparatus have been developed to provide relative orientation information to the pilots of the planes flying in formation. This information has been primarily related to the attitude of the aircraft and provided no information with respect to the degree or direction of deviation from an optimum attitude. However, to enable aircraft to fly in closer formation and prevent the danger of accidental collision, precise attitude and relative position information has been found to be necessary. This information must indicate not only deviation but also the degree and direction of deviation.

Existing position reference systems for night formation flying consist of lights or illuminated translucent materials positioned along the trailing edge of an aircraft empennage such as shown in Orlansky Patent 2,704,321 issued in the United States on Mar. 15, 1955. This type of system, however, has many inherent disadvantages and is incapable of supplying certain necessary information. One disadvantage is the clear visibility of the illuminated reference system from ground observation stations. This is particularly undesirable in times of war or when flight security is necessary. During these times, it is not feasible to utilize the empennage lights because of their ground observable exposure and, consequently, night formation flying becomes highly dangerous and difficult.

The present invention provides a night formation flying aid which is mounted on the fuselage of an aircraft and projects its light in a limited direction so that it is visible to the pilot of an aircraft following within certain limited angles therefrom and is not visible either to the pilot of the aircraft upon which it is mounted, or to a ground observer.

A purpose of the applicant's night formation flying, position reference system is to provide relative position and attitude references which are color coded to enable close formation flying. Further, the position reference system is capable of communicating to the pilot of the pursuing aircraft by a system of color codes his relative position and attitude with relation to the aircraft he is following. By varying the colors within the applicant's position reference system, the pursuing pilot can determine whether he is flying at the same attitude and relative position as the lead plane or in what direction and to what degree he is deviating therefrom. This information is extremely valuable in formation flying, because with present systems, the pilot may be flying at a different attitude than the lead plane and realize that he is not at the correct attitude, but not know the degree or direction of deviation. Therefore, his correction may be in a wrong direction which would make the deviation even greater and possibly cause a collision. The applicant's system enables the pilot to automatically know whether he is up, down, to the right or the left, or at the same attitude and relative position as the lead plane.

The present position reference system consists of a V-shaped unit; the legs or panels of the V are symmetrically and partially masked by an opaque bar at their vertex, the internal wall surface of both legs of the V are illuminated in a common distinguishable color, and the external surfaces of the legs of the V are illuminated in contrasting colors to each other and to the internal surface. This color coded system will enable a pilot, when following a lead plane, to ascertain whether he is at the correct attitude and relative position. If the pilot is at the correct attitude and relative position, the opaque bar at the vertex of the V-shaped unit will bisect the internal color coded leg portions. As the pilot deviates from the correct attitude or position, the opaque bar bisecting the unit will change its position relative to the internal color coded leg portions. If the pilot deviates from the correct formation flight position beyond a predetermined degree of error, the illuminated colors on the external surface of the legs of the V will come into view. By standardizing the colors, the pilot will know automatically by the visible colors and the position of the opaque bar whether he is at the correct attitude, within a few degrees in either direction, or within a larger number of degrees in either direction of the correct formation course.

An object of this invention is to provide a new and improved position reference system.

Another object of this invention is to provide a night formation flying aid which is not visible from the ground.

Another object of this invention is to provide a night formation flying aid which enables the pilot to determine his attitude and position with reference to a lead plane within predetermined degrees of errors.

Another object of this invention is to provide a color coded night formation flying aid.

Another object of the invention is to provide a color coded night formation flying aid wherein color references indicate the viewing angle.

Another object of this invention is to provide a night formation flying aid having an indicator for providing information on finite high-low positions within an acceptable attitude range.

Another object of this invention is to provide a night formation flying aid which is capable of providing both attitude and relative position references.

Another object of this invention is to provide a luminescent, color-coded position reference system.

These and other objects and novel features of the present invention will be more clearly and fully set forth in the following specification, attached drawings and claims. In the specification, for the purpose of completeness of disclosure, a preferred embodiment has been described in detail without intending to limit the scope of the invention. The attached drawings illustrate the preferred embodiment of the invention, in which:

FIGURE 3 is a front elevation view of the position reference apparatus at zero error with the opaque bar centered;

FIGURE 4 is a front elevation view showing a small deviation from zero error wherein the opaque bar no longer bisects the internal color field; and FIGURE 5 is a front elevation view showing a gross error indication wherein the external color field comes into view.

Figure 1:
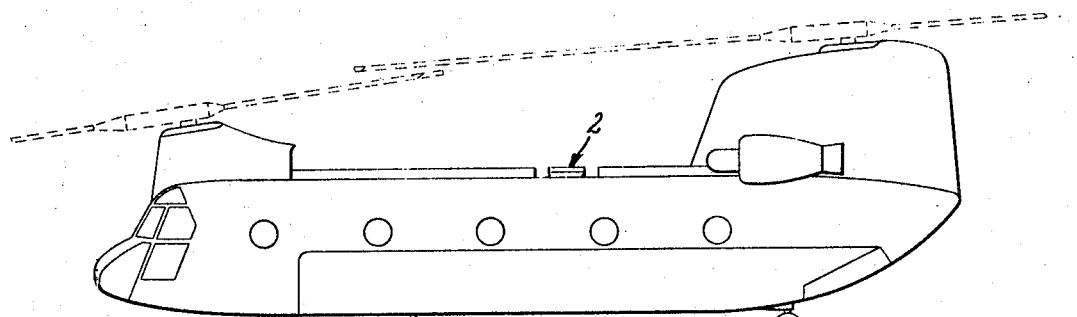
FIGURE 1 shows an aircraft utilizing the invention.

Referring now to the drawings, wherein like reference numbers designate like or corresponding parts throughout the several views, there is shown in FIGURE 1 a helicopter 1 having a position reference apparatus 2 mounted on the fuselage thereof.

Figure 2A:
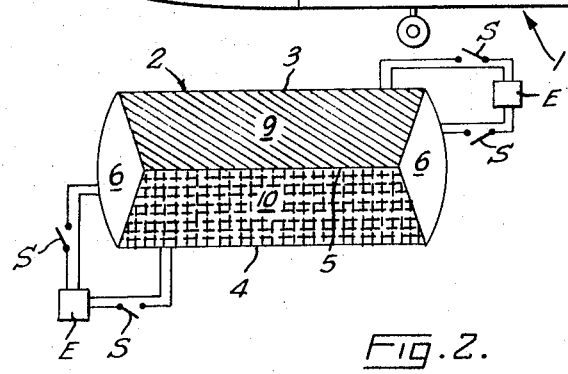
FIGURE 2a is a rear elevation of the apparatus shown in FIGURE 2 and schematically illustrating a source of illumination therefor.
Figure 2:
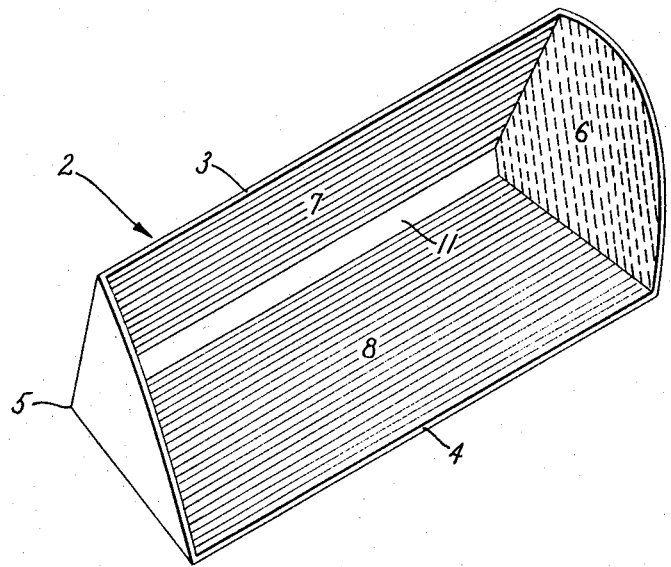
FIGURE 2 is a perspective view of position reference apparatus embodying the invention.

The position reference apparatus 2 (FIGURE 2) is of a substantially V-shaped configuration having a pair of substantially flat, trapezoidal, legs or panels 3 and 4 connected along one of their parallel edges to form a line of intersection or vertex 5. Both opposite free external non-parallel edges of the legs 3 and 4 extend outwardly to form an obtuse angle relative to an axis extending longitudinally of the vertex 5. Interconnecting each of the adjacent free external edges of the legs 3 and 4 is an end plate 6 which lies in juxtaposition to the external edges and assumes the same obtuse angle as the free edges relative to the vertex 5.

The legs 3 and 4 have internal wall surfaces 7 and 8 (FIGURE 2) and external wall surfaces 9 and 10 (FIGURE 2a), respectively. Although the drawings depict the use of specific colors, it is to be understood that any other colors or combination of colors consistent with the invention may be used. The internal wall surfaces 7 and 8 are illuminated in a common color and the external wall surfaces 9 and 10 are illuminated in colors contrasting to the internal wall surface color and each other. In order to provide the illuminated contracting colors, many methods well known to those skilled in the art can be used. For example, the legs 3 and 4 can be constructed from a translucent material. The translucent material is preferably one having a critical angle of light refraction of a magnitude for nearly all light rays passing through the material to be totally internally reflected. One such material that is suitable for this purpose is sold, and well known, under the trade name "Lucite." A suitable colored coating is then applied to the translucent material. A light source is then transmitted through the strips in such a manner that it is distributed throughout the entire surface of the translucent material, the distribution being uniform and the appearance being a continuous, uniformly illuminated color throughout the entire surface of each wall of the legs 3 and 4.

Additionally, the legs 3 and 4 can be constructed from an electroluminescent panel of the type sold by General Electric. Electroluminescent panels are constructed by sandwiching crystalline powders or phosphors between two electrically conductive surfaces. When the legs 3 and 4 and the end plates 6 are suitably connected to electrical power sources E by selectively closing switches S, the powders absorb the electrical energy and convert it instantaneously into light with minimal heat. The switches S are provided for selectively supplying power to the illuminated legs 3 and 4 during nightfall and allowing the legs 3 and 4 to remain in a non-illuminated condition during daylight. When electroluminescent panels are utilized, the need for a light source is eliminated due to the illuminating properties of the electroluminescent panels. Electroluminescent panels are available in a variety of colors and by varying the frequency and the amount of voltage supplied to them, the intensity of illumination can be controlled.

Bisecting the internal wall surfaces 7 and 8 along the vertex 5 is in an opaque bar 11. The opaque bar 11 consists of a structural material secured between the wall surfaces 7 and 8 or an opaque coating on the abutting edges of the internal wall surfaces 7 and 8 which form the vertex 5. As mentioned hereinbefore, interconnecting the external edges of the legs or panels 3 and 4 at an obtuse angle to the vertex 5 are end plates 6.

The end plates 6 are constructed from the same material as the legs 3 and 4 and are illuminated in the same manner. The end plates 6, however, are only illuminated in the same manner. The end plates 6, however, are only illuminated on their inner surfaces which face each other. The illuminated colors of the inner surface of the end panels 6 are different from the internal wall surfaces 7 and 8, the external wall surfaces 9 and 10, and from each other.

By locating the position reference apparatus 2 along various positions of the aircraft, information of varying types can be ascertained by the following pilot. For example, the apparatus can be mounted either horizontally or vertically on the fuselage of the aircraft. In operation, assuming the position reference apparatus 2 is mounted horizontally, when the pursuing pilot is in the correct attitude and relative position with respect to the lead plane, he will see the opaque bar 11 bisecting the internal color field 7 and 8 of the V-shaped position reference apparatus 2 as shown in FIGURE 3. As the position of the lead or pursuing plane varies vertically from zero error, the bar will move within the color field with respect to the changed relative position between the planes as shown in FIGURE 4.

As illustrated in FIGURE 5, if the pursuing plane deviates from the correct attitude beyond a pre-determined number of degrees, the external illuminated surfaces 9 and 10 of either panel 3 or 4 will come into view. By utilizing standard colors on the external wall surfaces 9 and 10, the pursuing pilot will know by the colors visible whether he is low or high. This information will enable him to correct his position quickly and efficiently. The viewing angle of the position reference apparatus 2 can be adjusted to provide for varying angles of deviation before the external illuminated surfaces 9 and 10 become visible. In order to maintain a position of zero error, the pursuing pilot "flies" the bar 11 within the internal background field of color so that the opaque bar 11 bisects the illuminated surfaces 7 and 8 on the internal walls of the V-shaped apparatus. As the viewing angle changes, different surfaces of the V-shaped apparatus 2 become visible. If, for example, the internal wall surfaces 7 and 8 are separated by an angle of ten degrees, only the internal surfaces 7 and 8 will be visible within approximately seventeen feet of deviation at a distance of one hundred feet. When the pursuing pilot is centered within the seventeen-foot range, he has zero error and the opaque bar 11 equally divides the internal color field 7 and 8 as shown in FIGURE 3. As deviation from zero error occurs, the bar 11 will appear to follow the pilot. The bar 11 remains visible when the pursuing pilot is plus or minus ten degrees from the center of the internal wall surfaces 7 and 8. When more than ten degrees of error occurs, one of the external illuminated surfaces 9 and 10 will begin to appear. As the error increases, the external illuminated surface will increase in size as the internal color field decreases. When corrective action is initiated, the external illuminated surface visible will progressively diminish. When an error of ten degrees is attained, the opaque bar 11 again appears and begins to move toward the center of the internal color surfaces 7 and 8. The pilot maintains his proper position by equally dividing the internal color segments 7 and 8 with the opaque bar 11. When the position reference apparatus 2 is orientated parallel to the longitudinal axis of the leading plane's fuselage, pitch information is evident from the orientation of the entire apparatus as indicated by FIGURES 3, 4, and 5. Azimuth information is provided by the illuminated end plates 6 located on each end of the apparatus 2. Both end plates 6 will be visible only when the proper azimuth position is maintained relative to the lead plane. When the pursuing plane is too far aft, only the fore end plate 6 will be visible and when the pursuing plane is too far forward, only the aft end plate 6 will be visible.

For the purposes of exemplification, particular embodiments of the invention have been shown and described according to the present understanding thereof. However, it will be apparent that changes and modifications in the arrangement and construction of the parts thereof may be resorted to without departing from the spirit and scope of the invention.

What is claimed is:
1. A position reference apparatus comprising:
   a pair of flat panels haviing illuminated external and internal wall surfaces, said panels lying in planes angularly disposed relative to one another to form a substantially V-shaped configuration and meeting at a line of intersection, said external wall surfaces being illuminated in colors contrasting to said internal wall surfaces, said external wall surfaces being observable from one side of said apparatus and said internal wall surfaces being observable from the opposite side of the apparatus; and
   an opaque bar substantially coextensive with said line of intersection.
2. A position reference apparatus in accordance with claim 1 including a pair of substantially flat illuminated end plates secured to said panels and lying in planes transverse to said panels and extending outwardly from said line of intersection.
3. A position reference apparatus in accordance with claim 1 wherein said panels are substantially trapezoidal in configuration, each panel having two spaced parallel edges and two spaced non-parallel edges, one of said parallel edges being disposed in contiguous relationship with said line of intersection, and said non-parallel edges extending outwardly at an obtuse angle from said line of intersection.
4. A position reference apparatus in accordance with claim 1 wherein internal wall surfaces are illuminated in a common color.
5. A position reference apparatus in accordance with claim 1 wherein said external wall surfaces are illuminated in colors contrasting to each other and to said internal wall surfaces.
6. A position reference apparatus in accordance with claim 1 wherein said external wall surfaces, said internal wall surfaces, and said end plates are constructed of a translucent material.
7. A position reference apparatus in accordance with claim 1 wherein said external wall surfaces, said internal wall surfaces, and said end plates are constructed of an electroluminescent panel.
8. In an aircraft, a position reference apparatus comprising:
   a pair of flat, substantially trapezoidal, panels, each panel having two spaced parallel edges and two spaced non-parallel edges and lying in planes angularly disposed relative to one another to form a substantially V-shaped configuration and meeting at a line of intersection, one of said parallel edges of each panel being disposed in contiguous relationship with said line of intersection and each of said non-parallel edges extending outwardly at an obtuse angle from said line of intersection, said panels having internal wall surfaces illuminated in a common color and external wall surfaces illuminated in colors contrasting to each other and to said internal wall surfaces, an opaque bar substantially coextensive with said line of intersection; and
   a pair of end plates illuminated in colors contrasting to said internal and said external wall surfaces, said end plates mounted to said panels at said non-parallel edges thereof.
9. A position reference apparatus in accordance with claim 8 including a power source connected to said position reference apparatus and means for actuating said power source to provide an electrical current to said position reference apparatus whereby said internal wall surfaces, said external wall surfaces, and said end plates are illuminated.

References Cited
UNITED STATES PATENTS

| | | | |
|---|---|---|---|
| 1,931,712 | 10/1933 | Trahey | 240—7.5 |
| 2,122,166 | 6/1938 | Westman | 240—7.7 X |
| 2,257,127 | 9/1941 | Roper et al. | 340—25 X |
| 2,328,032 | 8/1943 | Roper | 240—7.7 |
| 2,740,038 | 3/1956 | Carrie | 240—7.5 |
| 3,037,137 | 5/1962 | Motson | 250—71 X |
| 3,311,877 | 3/1967 | Projector et al. | 340—25 X |

LOUIS R. PRINCE, Primary Examiner

D. M. YASICH, Assistant Examiner

U.S. Cl. X.R.

240—7.7; 340—25, 366